United States Patent [19]

Wagner et al.

[11] Patent Number: 5,569,557
[45] Date of Patent: Oct. 29, 1996

[54] BATTERY CELL SPACER FOR EARTHQUAKE PROTECTED BATTERY RACKS

[75] Inventors: Franz M. Wagner; Drew D. Heimer, both of Lansdale, Pa.

[73] Assignee: C & D Charter Power Systems, Inc., Conshohocken, Pa.

[21] Appl. No.: 152,351

[22] Filed: Nov. 12, 1993

[51] Int. Cl.⁶ .......................... H01M 2/10; H01M 10/50
[52] U.S. Cl. .................... 429/99; 429/100; 429/120; 429/148
[58] Field of Search ................ 429/99, 100, 148, 429/159, 120, 130

[56] References Cited

U.S. PATENT DOCUMENTS 3,664,877  5/1972  Shaw ........................... 429/99
3,846,179  11/1974  Shaw ........................... 429/99
4,737,420  4/1988  Ikeda et al. ..................... 429/99 X
5,143,804  9/1992  McArthur et al. ................. 429/148

OTHER PUBLICATIONS

Jacobs Gardner, Office Products, 1989 (no month), "Report Covers", p. 802.

Primary Examiner—John S. Maples

[57] ABSTRACT

A spacer for keeping cell casings spaced from one another when supported side-by-side in a rack is provided by an elongated member having a bottom adapted to rest on the rack supporting the cells and sidewalls spaced apart from one another the distance of the desired spacing between adjacent cell casing. The sidewalls terminate in a top edge space from the bottom a greater distance than the designated spacing of the sidewalls in less than a quarter of the casing height. Preferably ventilating holes are provided through the spacer to allow circulation of air between the adjacent cells spaced apart by the spacer.

14 Claims, 3 Drawing Sheets

BATTERY CELL SPACER FOR EARTHQUAKE PROTECTED BATTERY RACKS

FIELD OF THE INVENTION

This invention relates to the problem, in the event of an earthquake, of maintaining properly spaced from one another battery cells, such as lead acid batteries, which are placed side by side in racks. Such cells are commonly interconnected in series on the rack so that alternate batteries are oriented opposite the position of intermediate batteries to facilitate the interconnection of the positive and negative terminal posts in the adjacent batteries. Frequently these batteries are often rigidly interconnected by rigid connectors which tend to hold the batteries at fixed spacing at the terminal post level. However, the batteries often require mechanical spacing means between the battery casings to hold them in position relative to one another in the event of earthquakes. Where they are not held spaced apart, the movement of one cell casing towards another might cause damage to the conductor to terminal post interconnection or bending of the terminal post and perhaps damage to the battery cell.

THE NATURE OF THE PRIOR ART

In the prior art it is industry-wide practice to use cell spacers consisting of cut sheets of one-half inch thick rigid plastic foam. If the cell casings maintain the same size and shape, such a solution is satisfactory, although it does not permit ventilation between the cells. Ventilation between the cells may be highly desirable in many cases. Also, a common problem inherent in many cells is cell casing or container bulging. The bulging usually begins at a low level, increases to a maximum at the middle of the cell casing and then recedes to essentially normal dimensions at the top of the cell casing and the cover. (Bulging produces some of the very problems intended to be avoided by the spacer when the spacer reaches the limit of compression.) Thereafter the battery casings are forced apart by the continuing bulging. Since connections between posts of opposite polarity in adjacent cells are frequently made of heavy conductive metal, typically lead alloy connectors, which are rigidly connected to the respective posts, movement of the cases relative to one another resulting from bulging sometimes results in bending of terminal posts and/or breaking of the seals between the battery case and the terminal.

When battery cells are already bulged at installation, the current industry standard foam spacers make connection of respective terminal posts by rigid fixed length connectors difficult, if not impossible, without damaging the seals at the posts. The resulting seal fracture process and its effect can be cumulative along the length of a rack of cells; conventional series connection and racking of cells also contributes to the damage.

SUMMARY OF THE INVENTION

This invention is directed to providing spacers between casings of adjacent cells on a rack so that the cells are not materially affected by bulging which often occurs in the normal course of cell life. At the same time, this invention facilitates ventilation between the casings of adjacent cells, which is not possible using prior art rigid foam sheet spacers. Good ventilation benefits battery performance and life.

More specifically, this invention concerns a spacer for keeping the cell casings spaced from one another when supported side by side on a rack. The spacer has a bottom adapted to rest on the rack supporting the cells and sidewalls spaced apart from one another at an exact distance of desired spacing between adjacent cell casings. Using a spacer embodying this invention gives exact cell spacing since the spacer is the same dimension as the required space between cells, which is not the case for the semi-rigid foam sheet spacer currently used by the industry.

The spacer sidewalls are connected by and terminate in a top edge which is spaced from the bottom of the spacer a greater distance than the designed spacing of the spacer (and cell) sidewalls and less than one-quarter of the cell or battery casing height. It is desirable to keep the spacer sufficiently short so that under no circumstances does the spacer act as a significant factor when bulging occurs. In preferred embodiments, the spacer height is approximately 2 inches.

In preferred embodiments, the spacer for use between adjacent cell casings is a unitary molded member preferably of length equal to cell length. In any event the spacer length should be at least a substantial portion of the length of the base of the cell casings. The spacer is desirably a resinous material having a high degree of flame retardance. The spacer is preferably molded to form a structure of generally hollow inverted U-shaped cross section.

DESCRIPTION OF THE DRAWINGS

The drawings illustrate the problem of the prior art, as well as the solution thereto provided by this invention.

SPECIFIC DESCRIPTION OF THE PRIOR ART

Figure 1:
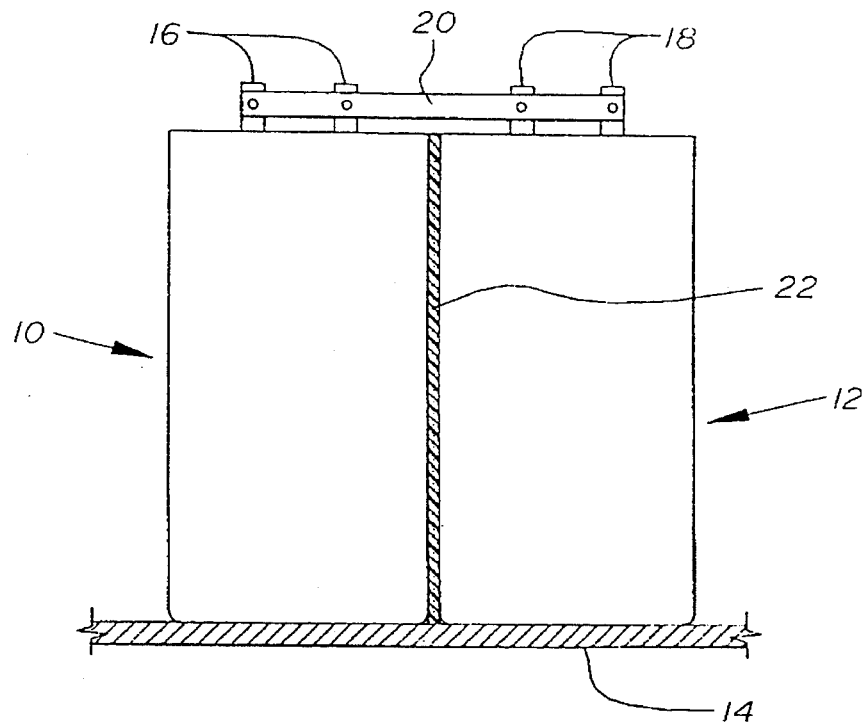
FIG. 1 is a side elevation of a pair of adjacent interconnected cells on a rack using prior art spacer means.

FIG. 1 represents the prior art technique for keeping a pair of lead acid cells 10 and 12, and more specifically the cases 13 thereof, separated from one another a predetermined distance. Cells 10, 12 are supported on a rack 14 which may be a shelf consisting of at least one board or inverted metal channel or may be made up of multiple members side by side. The cells in this case are in rectangular cases, which contain the cell plates and surrounding electrolyte.

Conductively connected to plates of each polarity in each cell is at least one terminal post. Since adjacent cells are connected in series, positive terminals 16 of cell 10 may be connected together as shown and, in turn, connected to negative terminals 18 of adjacent cell 12.

Cell connection is often made using rigid metallic, typically lead alloy conductive bars employing rigid connections for good conductivity. In the usual multiple cell situation, rack 14 may support many such cells 10, 12, with alternate cells having terminal posts of one polarity on a first side and intermediate cells having terminal posts of the other polarity on the same first side so that opposite polarity terminal posts of adjacent cells may be conveniently connected together. This arrangement staggers the position of the connections from front to back and connection of all the cells on a rack 14 in series.

To prevent the cell cases 13 from moving towards one another in the event of an earthquake or other disturbance tending to produce such movement, a spacer 22 consisting of a cut sheet of relatively rigid insulating foam material is placed between cases 13 of cells 10 and 12. The foam sheet spacer tends to hold cells 10, 12 apart should forces of any type, including earthquakes, tend to urge the cells together. Thus, the spacer of the prior art protects terminals 16 and 18 rigidly connected together by bar 20 and the terminal-case seals. However, foam spacer 22 occupies the entire space between cells 10, 12 so that no cooling air can pass between the cells. Moreover, when cells 10, 12 bulge at their midsections as shown in dotted lines in FIG. 2, the foam may initially yield somewhat; but ultimately the foam will reach its elastic limit and become rigid, causing the casings to be forced apart. This may have a detrimental effect on the terminals, their seals and/or the mechanical/electrical connection of the plates within the cases.

The insertion of a foam spacer 22 between the adjacent cells prevented ventilation from occurring between the walls of those cell casings. Also when bulging of the cell walls occurred, as shown in dashed lines at FIG. 2, the bulging caused problems after limits of compression of the foam pad were exceeded. Forces were applied through the casing to the terminal posts, which might have the effect of bending or breaking the individual terminal posts or the connection to the conductor bar 20, or destroying the seal between the cover to the cell casing and the terminal posts, and/or alternatively or concurrently causing damage to the cell case.

DETAILED DESCRIPTION OF This invention

Figure 2:
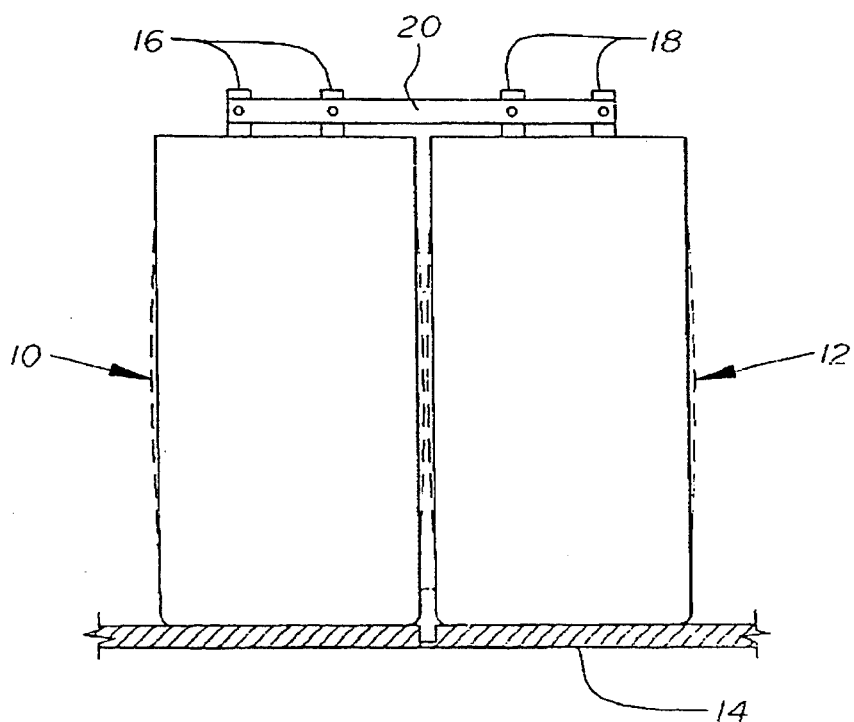
FIG. 2 is a side elevation view of adjacent interconnected cells on a rack as shown in FIG. 1 but using a spacer of this invention.

FIG. 2 is a view of the same structure as in FIG. 1, but with spacer 24 of this invention in place, instead of the foam spacer 22 of the prior art as shown in FIG. 1. (Because the battery and rack structures are essentially the same, similar numbers are used.) Once again cells generally designated 10, 12 are shown so that the positive terminals 16 of cell 10 are at the same end of the top of the cells and same side of rack 14 as negative terminals 18 of cell 12, thus enabling rigid conductive bar 20 to be affixed to the terminal posts solidly and rigidly, in conformance with requirements of good conductivity.

It will be understood that in practice the rack 14 is extended and eight or ten or more cells may be placed on the same rack, in side-by-side relationship. Connection of the adjacent cells is made so that the cells effectively are rigidly spaced a fixed distance apart at their tops.

The cell cases are normally placed on rack 14 so that their longer sidewalls face one another and the shorter sidewalls face outwards from the rack. Spacer 24 of this invention is placed with a narrow edge on the rack and wider sidewalls extending upwardly from the rack. The amount of this height is preferably on the order of 2 inches.

It is desirable to keep the spacer sidewalls as short as possible, and in any event no greater than a quarter of the height of the cell cases against which the spacers are placed.

In practice, for stability the spacer height dimension must be somewhat greater than the spacer width dimension to prevent any tendency of the spacer to twist or roll. The length of the spacer need not be the full length of the cell case walls against which the spacer bears, but for stability the spacer length should be a substantial portion of the cell case wall length.

In practice, it is desirable that ventilating openings be provided through the spacer along the length of the spacer, terminating at the spacer top edge or top surface, whereby air may pass through the spacer to more readily circulate between adjacent spaced cells.

In practice, it is also very desirable to provide stop extensions 26 extending below the bottom of the spacer in position not to interfere with supporting rack 14, but in a position to cooperate with rack 14. That cooperation should be such that when in functioning position stop extensions 26 limit spacer lateral movement, which might otherwise allow the spacer to slip from between the cells.

Figure 3:
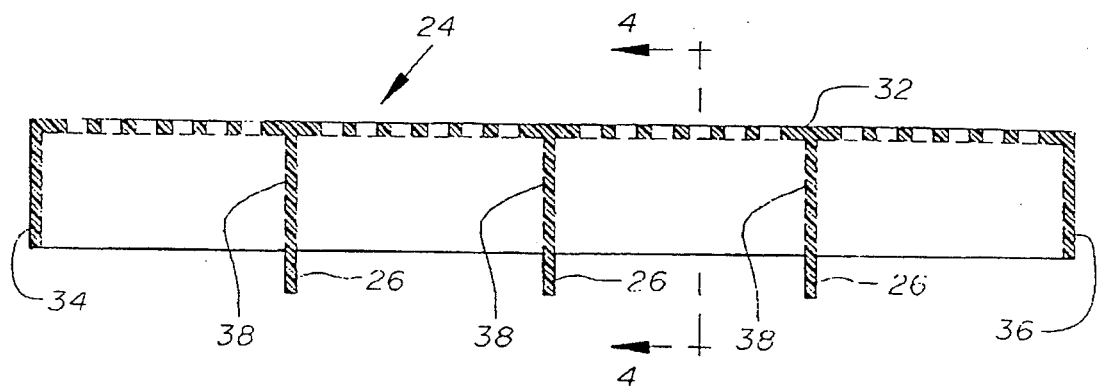
FIG. 3 is a side elevational view of a preferred form of spacer in accordance with this invention showing the interior structure in section.
Figure 4:
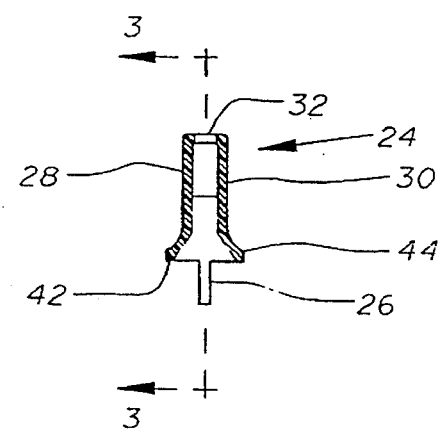
FIG. 4 is a sectional view taken along line 4—4 of FIG. 3.
Figure 5:
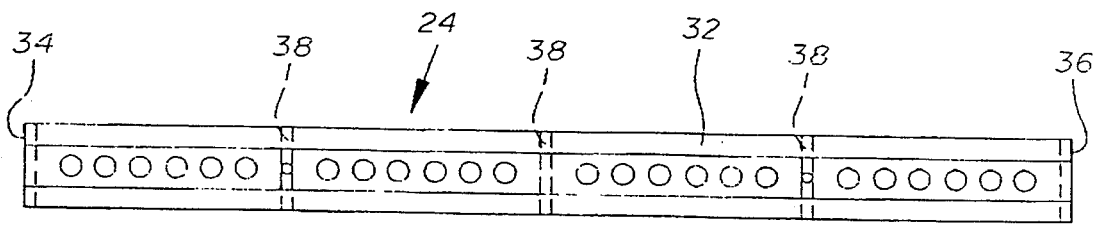
FIG. 5 is a plan view of the top of the spacer shown in FIGS. 3 and 4.

Referring now to FIGS. 3–5, a preferred embodiment of the spacer of this invention is shown. It is most easily seen in FIG. 4, wherein the dotted lines show bounds of interior walls. A preferred embodiment of the spacer is an inverted U-shaped hollow molded member having lengthwise extending sidewalls 28 and 30 connected at the top by a lengthwise extending top wall 32. As seen in FIGS. 3 and 5, these walls are closed by end walls 34 and 36.

Preferably periodically along the length of the spacer are provided reinforcing cross webs 38 extending to sidewalls 28, 30 and top wall 32 in the embodiment shown. Two of webs 38 shown extend below the bottom of the spacer 24 to provide stops 26. The position of stops 26 is determined by the nature and dimensions of rack 14, since stops 26 are intended to bracket at least a portion of rack 14 so as to limit lengthwise movement of spacer 24 (once the spacer is in position) to the distance respective stops 26 must move unitarily with the remainder of spacer 24 to make contact with an interfering sidewall of rack member 14.

Figure 6:
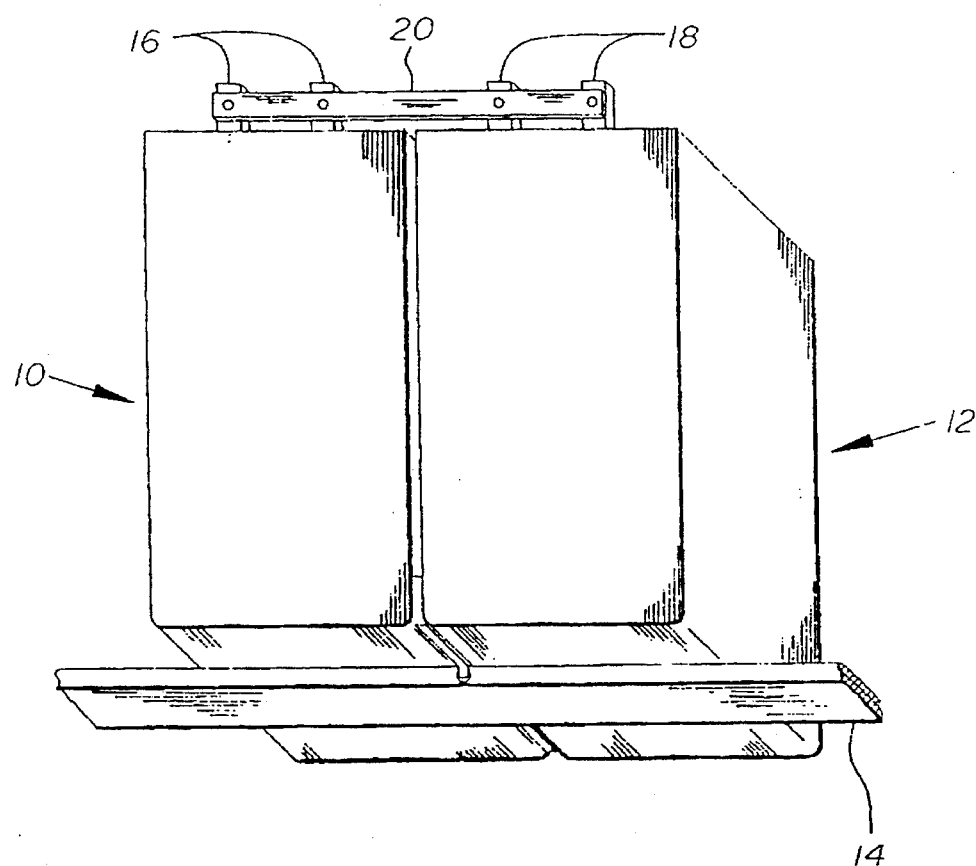
FIG. 6 is a perspective view from below showing the support of a pair of cells on a rail employing the spacer of this invention.
Figure 7:
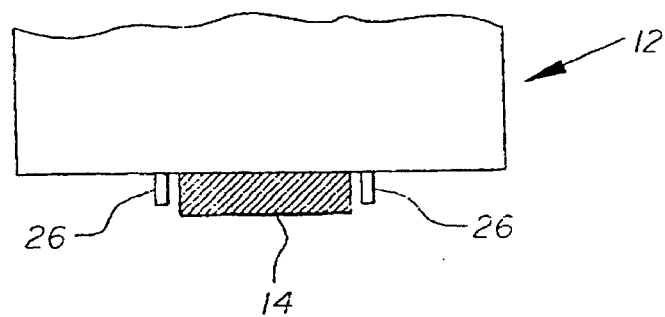
FIG. 7 is a partial side elevational view of the structure shown in FIG. 6.

FIGS. 6 and 7 help visualize this placement respecting rack member 14.

Respecting the geometry of spacer 24, it will be understood that the stops may be placed on other portions of the structure, but it is convenient to position them as shown so that they may be molded as part of reinforcing webs 38. Different dimensions of a rack may require different positioning of reinforcing webs 38 to facilitate placing stops 26 in effective positions.

Through top wall 32 of spacer 24 are provided ventilating openings 40. These ventilating openings may be of any size or shape consistent with the structure employed and are provided for the purpose of improving circulation between adjacent cells which are maintained in a desired space apart by configuration spacer 24. Some ventilation, of course, occurs from the side but providing for circulation from the bottom as well improves the situation considerably.

The molded spacer 24 is preferably injection-molded polyvinyl chloride (PVC) which meets the highest degree of flame retardancy specified by Underwriters Laboratory UL94 VO.

It should be observed that in the most preferred form of this invention the spacer is slightly wedge-shaped. That is, sidewalls 28 and 38 converge slightly approaching top wall 32. Additionally, sidewalls 28 and 30 respectively, may terminate in flared bases 42, 44 (as illustrated in FIG. 4) conforming to the shape of the bases of the cell case sidewalls against which flared bases 42,44 are placed.

The cell cases are, in many cases, fabricated with a small radius of curvature; this enables spacer 24 to better interlock or interfit between adjacent cells so that the spacer does not tend to rotate or twist within its allocated space. The wedging effect will hold the spacer more snugly in place. In some cases, spacer 24 may be made or molded to a custom shape, to conform very closely to the cell cases. The shape of the spacer conforms to the shape of adjacent cells to lock it in a vertical position, so that the spacer can not jump up.

FIGS. 6 and 7 to show more specifically the effect of spacer 24 as shown in FIGS. 3–5, in position between cells by viewing the cells from the bottom and laterally across the rack support. The spacer 24 is rigid so as to provide exact distance spacing as a key feature and it is used as a gauge at cell installation to provide for cell spacing.

While a preferred embodiment has been described in connection with this invention, it will be understood by those skilled in the art that many variations of this embodiment are possible and many different materials may be used for the spacer. All such variations within the scope of the claims are intended to be within the scope and spirit of this invention.

While the preferred embodiments of the invention have been described above and alternative embodiments have also been described, the scope of protection to which the invention is believed entitled is defined by the claims and by equivalents thereto which perform substantially the same function in substantially the same way to achieve substantially the same result as set forth in the claims, so long as such substantial equivalents, as defined by a claim for such substantial equivalent, do not read on the prior art.

I claim:

1. An open-center longitudinally elongated spacer for keeping cell casings spaced from one another when supported side by side on a rack comprising a unitary member having a bottom adapted to rest on the rack supporting cells and sidewalls transversely spaced apart from one another by said open center the distance of spacing between adjacent cell casings, connected by and terminating in a top edge spaced from the bottom a greater distance than the spacing of the sidewalls and less than one-quarter of the casing height in which ventilating openings are provided through the spacer along the length of the spacer terminating at the top edge whereby air is enabled to pass through the spacer to more readily circulate between the adjacent spaced cells.

2. An open-center longitudinally elongated spacer for keeping cell casings spaced from one another when supported side by side on a rack comprising a unitary member having a bottom adapted to rest on the rack supporting cells and sidewalls transversely spaced apart from one another by said open center the distance of spacing between adjacent cell casings, connected by and terminating in a top edge spaced from the bottom a greater distance than the spacing of the sidewalls and less than one-quarter of the casing height in which stop extensions, narrow relative to the length of the spacer, are provided to extend below the bottom of the spacer in position not to interfere with the rack, but in position to cooperate with the rack such that, when in functioning position, the stop extensions limit lateral movement which might otherwise allow the spacer to slip from between the cells.

3. A spacer for use between adjacent cell casings on a rack, comprising a molded member extending along the base of the adjacent cell casings between which it is to be employed, comprised of a resinous material having a high degree of flame retardant property molded to form a structure of generally hollow inverted U-shaped cross section, sidewalls of the spacer providing bearing outside surfaces spaced apart essentially the spacing between cell casings, the height of the spacer being greater than the spacing of the sidewalls and less than one-quarter of the casing height in which a plurality of holes are provided in succession along the length of the spacer at the top of the spacer and through a top wall to provide ventilation in the space between the cells defined by the spacer.

4. A spacer for use between adjacent cell casings on a rack, comprising a molded member extending along the base of the adjacent cell casings between which it is to be employed, comprised of a resinous material having a high degree of flame retardant property molded to form a structure of generally hollow inverted U-shaped cross section, sidewalls of the spacer providing bearing outside surfaces spaced apart essentially the spacing between cell casings, the height of the spacer being greater than the spacing of the sidewalls and less than one-quarter of the casing height in which periodically along the length of the spacer between sidewalls of the inverted U-shaped structure is provided a reinforcing cross web to strengthen the structure.

5. The spacer of claim 4 in which the reinforcing web in at least two places along the length is extended below the lower edge of the spacer in order to provide at least a pair of stop members positioned to engage side surfaces of the supporting rack to prevent substantial lengthwise movement of the spacer in either direction.

6. The spacer of claim 5 in which the inverted U-shaped structure has a top wall interconnecting with the sidewalls and the U-shaped structure is closed at each end by an end wall.

7. The spacer of claim 6 in which holes are provided periodically through the top wall of the spacer to permit ventilation by air circulation between the cells.

8. The spacer of claim 7 in which the spacer sidewalls are slightly tapered converging upwardly and to permit the shape and dimension to determine the exact space between cells so the spacer can be used as a gage for cell installation.

9. The spacer of claim 8 in which the sidewalls are shaped to conform to the shape of the lower part of casings.

10. A longitudinally elongated one-piece spacer molded of flame retardant plastic for maintaining separation of rack-supported adjacent cell casings, having a generally open inverted U-shape cross-section with outer surfaces of upstanding portions of said U-shape providing bearing surfaces for contacting said adjacent cell casings and being spaced apart essentially a distance of separation of said cell casings, height of said U-shape being greater than transverse separation of said upstanding portions in which the U-shape tapers to be narrower at the base of the U.

11. A longitudinally elongated one-piece spacer molded of flame retardant plastic for maintaining separation of rack-supported adjacent cell casings, having a generally open inverted U-shape cross-section with outer surfaces of upstanding portions of said U-shape providing bearing surfaces for contacting said adjacent cell casings and being spaced apart essentially a distance of separation of said cell casings, height of said U-shape being greater than transverse separation of said upstanding portions in which a plurality of holes are formed in longitudinal succession along the base of the U-shape to provide ventilation in space maintained by said spacer between said cells.

12. A longitudinally elongated one-piece spacer molded of flame retardant plastic for maintaining separation of rack-supported adjacent cell casings, having a generally open inverted U-shape cross-section with outer surfaces of upstanding portions of said U-shape providing bearing surfaces for contacting said adjacent cell casings and being spaced apart essentially a distance of separation of said cell casings, height of said U-shape being greater than transverse separation of said upstanding portions further comprising at least one transverse web extending between interior surfaces of side walls of said U-shape providing reinforcing strength for said spacer.

13. The spacer of claim 12 in which said reinforcing web comprises a tabular portion extending beyond a vertical extremities of said U-shape portions to define stop members positioned to engage side surfaces of a rack supporting said cells, to preclude substantial longitudinal movement of said spacer.

14. A longitudinally elongated one-piece spacer molded of flame retardant plastic for maintaining separation of rack-supported adjacent cell casings, having a generally open inverted U-shape cross-section with outer surfaces of upstanding portions of said U-shape providing bearing surfaces for contacting said adjacent cell casings and being spaced apart essentially a distance of separation of said cell casings, height of said U-shape being greater than transverse separation of said upstanding portions in which said U-shape structure is closed at each end of said spacer by a transverse end wall extending vertically substantially the height of said spacer.

* * * * *